UNITED STATES PATENT OFFICE.

ADOLPH SOMMER, OF BERKELEY, CALIFORNIA.

COMPOUND OF TALLOW AND CHLORIDE OF SULPHUR.

SPECIFICATION forming part of Letters Patent No. 389,021, dated September 4, 1888.

Application filed February 14, 1887. Serial No. 227,576. (Specimens.)

*To all whom it may concern:*

Be it known that I, ADOLPH SOMMER, a citizen of the United States, residing at Berkeley, in the county of Alameda and State of California, have invented new and useful Compounds of Tallow and Kindred Solid Fats with Chloride of Sulphur and a Process of Making the Same; and I do hereby declare that the following is a full and exact description of the invention, which will enable others skilled in chemical manipulations to prepare and execute the same.

It has been shown by myself and others that most fatty oils, when mixed in the cold with from one-fifth to one-fourth of their weight of chloride of sulphur, are converted, usually in less than half an hour, with the liberation of much heat, into more or less elastic solid masses which bear no semblance to the oils from which they were derived. These solid compounds melt when heated above 120° centigrade, and form under considerable frothing brown or black liquids of a disagreeable odor, which on cooling do not return to the original solid elastic state. No like results, however, follow when tallow or a similar solid fat is substituted for the oil. Only a very imperfect union takes place in the cold, the mixture smelling strongly of chloride of sulphur even after standing for several days. The product which results under these conditions is usually a brown unsightly compound, of an acrid smell and the consistence and melting-point of the original fat; but when a mixture of about eight parts of the fat and one part of the chloride of sulphur is made at an elevated temperature, which for mutton-tallow is best between 40° and 45° centigrade, the combination takes place readily. The union is attended with a considerable rise in temperature, and is generally complete in one hour. If precautions have been taken to remove the chlorhydric acid as soon as it is formed, the product is a waxy mass of a pale yellow color and an agreeable odor. It melts at about the same temperature as the original fat, forming a pale yellow liquid which on cooling resumes its original waxy consistence. Since, then, good results cannot be obtained by combining such solid fats as tallow with chloride of sulphur in the manner that has been practiced with fatty oils—namely, by mixing the two in the cold or at the ordinary temperature—I proceed in the following manner: In order to produce these compounds, I purify the commercial tallow or other fat from water and other impurities by melting and allowing it to stand in the liquid state until the impurities have separated. The purified fat is then carefully drawn off from the sediment, weighed or measured, and mixed with about two and one-half per cent., by weight, of finely-powdered air-slaked lime, (or some analogous substance,) for the purpose and in the manner described in another application, entitled "Neutral compounds of fatty oils with chloride of sulphur, and a process of making the same," Serial No. 209,637, filed July 31, 1886. After the lime has been thoroughly incorporated the mixture is allowed to cool, and at the same time continually agitated, in order to keep the consistence uniform. When a pasty consistence has been reached, the chloride of sulphur to the amount of from one-eighth to one-seventh of the weight of the fat is added and well distributed by active stirring. The stirring is continued until the combination is complete—that is, until the smell of chloride of sulphur is no longer perceptible. If, however, as sometimes happens when the initial temperature of the fat is too low, the reaction between the chloride of sulphur and fat is sluggish, and in consequence of it the smell of chloride of sulphur is still perceptible an hour after its addition, the mixture is warmed, preferably in a water bath, and kept warm until the combination is complete.

Instead of adding chloride of sulphur to a fat which has previously been mixed with air-slaked lime or an analogous substance, I may form the same compound without the presence of lime; but in this case the compound contains a small amount of free chlorhydric acid, the removal of which is necessary for most purposes to which the compound is applied. To effect the removal of the free chlorhydric acid, I proceed in the same manner as described and claimed in the application already cited—namely, by adding to the liquefied compound a neutralizing agent.

While I find that the proportions as stated above give satisfactory results in most cases, I do not confine myself strictly to these, but alter them as the nature of the fat or the purpose to which the finished compound is to be applied may indicate.

Of the properties which distinguish these compounds from the natural fats from which they were prepared I will here mention their greater homogeneity and their greater stability at the ordinary temperature. While most natural solid fats, because of their being composed of mixtures of solid and liquid fats, very readily part with a portion of their liquid constituents, even at the ordinary temperaature, such fats when combined with chloride of sulphur are free from this tendency, their constituents being so altered and amalgamated that they form a perfectly uniform mixture. Most fats are, too, in their natural state very prone to partially decompose and to turn rancid; but after the treatment with chloride of sulphur they may, at least at the ordinary temperature, be kept, even exposed to the air, for an indefinite length of time without undergoing any appreciable decomposition. These compounds are therefore better adapted for many purposes where homogeneity and stability are required than the natural solid fats.

Having thus described my invention, what I claim as new, and desire to secure by Letters Patent, is—

1. The process of combining a solid fat, such as tallow, with chloride of sulphur, consisting in reducing the tallow (or other fat) to a semi-liquid state by the aid of heat, then incorporating with it the chloride of sulphur and keeping the mixture warm until the union is complete.

2. As a new chemical product, the compound of a solid fat, such as tallow, with chloride of sulphur.

3. As a new composition, the compound of a solid fat, such as tallow, with chloride of sulphur, holding in suspension or solution a neutralizing agent, its chlorhydric-acid derivative, or both.

ADOLPH SOMMER.

Witnesses:
HERMAN ROYER,
JOHN C. RUED.

Corrections in Letters Patent No. 389,021.

It is hereby certified that in Letters Patent No. 389,021, granted September 4, 1888, upon the application of Adolph Sommer, of Berkeley, California, for an improvement in "Compounds of Tallow and Chloride of Sulphur," errors appear in the printed specification requiring the following corrections: On page 1, line 55, the words "In order to produce these compounds," should be stricken out; in lines 66–69, same page, the words "Neutral compounds of fatty oils with chloride of sulphur, and a process of making the same, Serial No. 209,637, filed July 31, 1886," should read: *Process of making neutral compounds of fats and fatty oils with chloride of sulphur; Serial No. 227,575, filed February 14, 1887*, and in lines 98–99, same page, the words "the application already cited," should be stricken out and the words *a previous application entitled Neutral compounds, of fatty oils with chloride of sulphur, and a process of making the same, Serial No. 209,637, filed July 31, 1886*, inserted; and that the said Letters Patent should be read with these corrections therein that the same may conform to the record of the case in the Patent Office.

Signed, countersigned, and sealed this 25th day of December, A. D. 1888.

[SEAL.]

H. L. MULDROW,
*First Assistant Secretary of the Interior.*

Countersigned:

BENTON J. HALL,
*Commissioner of Patents.*